United States Patent
Andrew et al.

(10) Patent No.: US 6,263,110 B1
(45) Date of Patent: Jul. 17, 2001

(54) METHOD FOR DATA COMPRESSION

(75) Inventors: James Philip Andrew, Waverton; Andrew Peter Bradley, Castlecrag, both of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,773

(22) Filed: Sep. 29, 1998

(30) Foreign Application Priority Data

Sep. 29, 1997 (AU) .................................................. PO9514

(51) Int. Cl.⁷ ...................................................... G06K 9/36
(52) U.S. Cl. ............................................. 382/232; 382/248
(58) Field of Search ..................................... 382/232, 240, 382/244, 248, 233, 246

(56) References Cited

U.S. PATENT DOCUMENTS

| | | | |
|---|---|---|---|
| 5,315,670 | 5/1994 | Shapiro | 382/56 |
| 5,321,776 | 6/1994 | Shapiro | 382/56 |
| 5,412,741 | 5/1995 | Shapiro | 382/232 |
| 5,867,602 | * 2/1999 | Zandi et al. | 382/248 |
| 5,966,465 | * 10/1999 | Keith et al. | 382/232 |

FOREIGN PATENT DOCUMENTS

| | | | |
|---|---|---|---|
| 0855838A2 | 7/1998 | (EP) | H04N/7/26 |
| 2303030 | 2/1997 | (GB) | H03M/7/30 |

OTHER PUBLICATIONS

Bruce et al., "Wavelet Analysis", IEEE Spectrum, Oct. 1996, pp. 26–35.

Hanan Samet, "The Quadtree and Related Hierarchical Data Structures", ACM Computing Surveys, vol. 16, No. 2, Jun. 1984, pp. 187–260.

P. Delogne, "Picture Coding A Tutorial Introduction", Revue H F, BE, SOC. BELGE DES ING. DES TELECOMM. & D'ELECTRONIQUE. OPHAIN, vol. 15, No. 3/04, 1991, pp. 41–74.

K. Nguyen–Phi et al. "Image Compression Using Bit–Plane coding of Wavelet Coefficients". Elec. Letters, vol. 32, No. 19, 1996, pp. 1773–1775.

\* cited by examiner

*Primary Examiner*—Jose L. Couso
*Assistant Examiner*—Anh Hong Do
(74) *Attorney, Agent, or Firm*—Fitzpatrick, Cella, Harper & Scinto

(57) ABSTRACT

A method is disclosed of encoding data including transforming the data into a series of components having different frequency characteristics, said components each including a series of coefficients; encoding said coefficients in a compact form, said coefficients including a binary string and said encoding including providing a first efficient encoding technique to encode the number of leading zeros in said binary string, and rounding said coefficients such that a rounded coefficient does not alter significantly the efficient coding of the leading zeros. Preferably, the rounding can includes discarding a first number of insignificant coefficients and adding one to the more significant coefficients only where the more significant coefficients are not zero. The invention has particular application when utilized in encoding wavelet transformed data and when utilized on image data.

18 Claims, 18 Drawing Sheets

| Bit Plane | Binary Representation | | | |
|---|---|---|---|---|
| 7 | 1 | 0 | 1 | 0 |
| 6 | 0 | 0 | 0 | 1 |
| 5 | 0 | 0 | 1 | 1 |
| 4 | 0 | 0 | 1 | 0 |
| 3 | 0 | 0 | 1 | 0 |
| 2 | 1 | 1 | 1 | 0 |
| 1 | 1 | 1 | 1 | 1 |
| 0 | 1 | 1 | 1 | 1 |
|  |  |  |  |  |
| Decimal Form | 135 | 7 | 191 | 99 |

Fig. 18

| Bit Plane | Binary Representation | | | |
|---|---|---|---|---|
| 7 | 1 | 0 | 1 | 0 |
| 6 | 0 | 0 | 1 | 1 |
| 5 | 0 | 0 | 0 | 1 |
| 4 | 0 | 0 | 0 | 0 |
| 3 | 1 | 0 | 0 | 0 |
| 2 | X | X | X | X |
| 1 | X | X | X | X |
| 0 | X | X | X | X |
| | | | | |
| Decimal | 132 | 0 | 192 | 96 |

Fig. 19

| Bit Plane | Binary Representation | | | |
|---|---|---|---|---|
| 4 | 1 | 0 | 0 | 1 |
| 3 | 0 | 0 | 1 | 1 |
| 2 | 0 | 1 | 1 | 1 |
| 1 | 0 | 1 | 1 | 0 |
| 0 | 0 | 1 | 0 | 1 |
| | | | | |
| DecimalForm | 16 | 7 | 14 | 29 |

Fig. 21

METHOD FOR DATA COMPRESSION

BACKGROUND OF THE INVENTION

1. Field of Invention

The present invention relates to the field of digital data compression with particular application to digital image compression and digital video compression. In particular, the present invention relates to the effective quantisation of transform image coefficients for image compression methods that employ bit plane encoding and includes the efficient rounding prior to bit plane encoding of transformed image and video signals.

2. Description of the Related Art

The field of digital data compression and in particular digital image compression has attracted great interest for some time.

In the field of digital image compression, many different techniques have been utilised. In particular, one popular technique is the JPEG standard which utilises the discrete cosine transform (DCT) to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent lossless compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics, reference is made to "Wavelets for Computer Graphics", I. Stollinitz et. al. published 1996 by Morgan Kaufmann Publishers, Inc.

Many efficient methods of image compression use a bit plane encoding of the transform image data. For example, the following coding methods effectively employ bit plane coding of transform (usually discrete wavelet transform) image data: the embedded zero-tree wavelet (EZW) family of methods U.S. Pat. Nos. 5,412,741, 5,315,670 and 5,321,776, and binary context entropy coding of transform image bit planes. All of these methods offer some of the most competitive performance currently available in terms of the rate/distortion/complexity tradeoff.

With bit plane coding techniques, usually not all the bit planes are coded. Only the most significant bit plane down to a predetermined minimum bit plane is coded. For example, consider the coding of the coefficient 135, which has an 8-bit binary representation 10000111, with a bit plane coding of this coefficient down to and including bit plane 3 (Numbering beginning from bit plane 0, the least significant bit). The coefficient is coded with the bits 10000 being the bits in bit plane 7, 6, 5, 4 and 3 respectively. The decoder, receiving this information, then can replicate these bits in bit planes 7, 6, 5, 4 and 3 but does not know the bits in the lower bit planes. Instead of assuming the bits are all zero in the lower bit planes, in which case 135 is decoded as 10000000 binary (128 decimal) the decoder can assume a 1 in bit plane 2 and zeros in the other lower bit planes, in which case 135 is decoded as 10000100 binary (132 decimal). This is a generalised form of rounding, and generally offers better results because it reduces the (average) difference between the decoded coefficient and the original.

As an alternative this generalised rounding an be performed at the encoder. A 1 in bit plane 2 can be added to 135 (10000111+00000100=10001011 or 139 decimal) prior to coding. With ensuing coding down to bit plane 3, the coefficient is coded as 10001 and decoded as 10001000 or 136 decimal. In fact, this is simply a form of uniform quantisation.

For efficient bit plane coding techniques, such as SWEET (see below) and the EZW family, rounding at the encoder (or uniform quantisation) is not efficient, and degrades the compression performance. The reasons behind this are discussed hereinafter.

SUMMARY OF THE INVENTION

It is an object of the invention to ameliorate one or more disadvantages of the prior art.

According to a first aspect of the invention, there is provided a method of encoding data including: transforming the data into a series of components having different frequency characteristics, said components each including a series of coefficients; encoding said coefficients in a compact form, said coefficients including a binary string and said encoding including providing a first efficient encoding technique to encode the number of leading zeros in said binary string, and rounding said coefficients such that a rounded coefficient does not alter its number of leading zeros.

According to a second aspect of the invention, there is provided a method of encoding data including: transforming the data into a series of components having different frequency characteristics, said components each including a series of coefficients; dividing said components into predetermined blocks; encoding for each of said blocks, said coefficients in a compact form, said coefficients including a binary string and said encoding including providing a first efficient encoding technique to encode the number of leading zeros of the largest magnitude coefficient in each block, and said rounding including ensuring that a rounded coefficient does not alter the number of leading zeros within a largest magnitude rounded coefficient in said block.

According to a third aspect of the invention, there is provided an apparatus for encoding data including: transformation means for transforming the data into a series of components having different frequency characteristics, said components each including a series of coefficients; encoder means for encoding said coefficients in a compact form, said coefficients including a binary string and said encoding including providing a first efficient encoding technique to encode the number of leading zeros in said binary string, and rounding said coefficients such that a rounded coefficient does not alter its number of leading zeros.

According to a fourth aspect of the invention, there is provided an apparatus for encoding data including: transformation means for transforming the data into a series of components having different frequency characteristics, said components each including a series of coefficients; division means for dividing said components into predetermined blocks; encoder means for encoding, for each of said blocks, said coefficients in a compact form, said coefficients including a binary string and said encoding including providing a first efficient encoding technique to encode the number of leading zeros of the largest magnitude coefficient in each block, and said rounding including ensuring that a rounded coefficient does not alter the number of leading zeros within a largest magnitude rounded coefficient in said block.

According to a fifth aspect of the invention, there is provided a computer program product including a computer readable medium having recorded thereon a computer program for encoding data, the computer program product including: transformation means for transforming the data into a series of components having different frequency characteristics, said components each including a series of coefficients; encoder means for encoding said coefficients in a compact form, said coefficients including a binary string and said encoding including providing a first efficient encoding technique to encode the number of leading zeros in said binary string, and rounding said coefficients such that a rounded coefficient does not alter its number of leading zeros.

According to a sixth aspect of the invention, there is provided a computer program product including a computer readable medium having recorded thereon a computer program for encoding data, the computer program product including: transformation means for transforming the data into a series of components having different frequency characteristics, said components each including a series of coefficients; division means for dividing said components into predetermined blocks; encoder means for encoding, for each of said blocks, said coefficients in a compact form, said coefficients including a binary string and said encoding including providing a first efficient encoding technique to encode the number of leading zeros of the largest magnitude coefficient in each block, and said rounding including ensuring that a rounded coefficient does not alter the number of leading zeros within a largest magnitude rounded coefficient in said block.

BRIEF DESCRIPTION OF THE DRAWINGS

Embodiments of the invention are described, by way of example only, with reference to the drawings, in which:

FIG. 18 illustrates an initial bit plane representation of a series of numbers;

FIG. 19 illustrates a form of bit plane after application of a first method of preferred embodiments;

FIG. 21 illustrates a bit plane representation of a number of numbers as used in an alternative embodiment.

DETAILED DESCRIPTION

Figure 1:
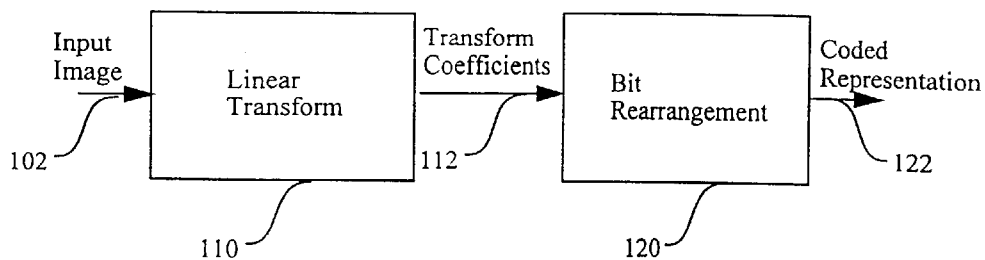
FIG. 1 is a high-level block diagram illustrating the image representation technique described in the herein-mentioned patent application.

Where reference is made in any one or more of the accompanying drawings to steps and/or features, which have the same reference numerals, those steps and/or features have for the purposes of this description the same function (s) and/or operation(s), unless the contrary intention appears.

Before proceeding with a description of the preferred embodiments, a description is given of the SWEET image compression and decompression method disclosed in Australian Provisional Patent Application No. PO 4728, entitled "A method for Digital Image Compression", filed on Jan. 22, 1997 by Canon Information Systems Research Australia Pty. Ltd. This method of compression and decompression is described in the following sections hereinafter entitled "1.0 Overview of SWEET Image Compression Method", "1.1 Encoding Process of First SWEET Image Compression Method", "1.2 Decoding Process of First SWEET Image Compression Method", "1.3 Two-Dimensional Example", and "1.4 Encoding Process of Second SWEET Image Compression Method".

1.0 Overview of SWEET Image Compression Method(s)

A high-level block diagram is illustrated in FIG. 1 to provide an overview of encoding method. An input image 102 is provided to the transform block 110, which is preferably a linear transform, to produce corresponding transform coefficients 112. A discrete wavelet transform (DWT) is preferably employed.

The two-dimensional DWT of an image is a transform that represents the image using a low frequency approximation to the image and three high frequency detail components. Conventionally, these components are termed subbands. Each of the four sub-images formed by the DWT is one quarter of the size of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detail subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced. For example, a discrete cosine transform (DCT) can be practiced. The transform coefficients 112, or more specifically the bit sequences representing their values, are then coded by the bit rearrangement block 120 in an efficient fashion to provide the coded representation 122.

The decoding process is simply the reverse of this encoding process. The encoded coefficients are decoded into the transform coefficients. The (transform domain) image is then inverse transformed to form the original image, or some approximation thereof.

Before proceeding with a further description of the embodiments, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 00001001. In this number, bit 3 is equal to 1, while bits 2, 1, and 0 are equal to 0, 0, and 1, respectively. Furthermore, a transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space, which passes through each bit sequence at the same bitnumber, is called a bitplane or bit plane.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The compression method and apparatus represents (or codes) these leading zeros, for blocks of coefficients, in an efficient manner. The remaining bits and sign of the number are encoded directly without modification.

To simplify and the description, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary. Further, for the purpose of compression, any information contained in fractional bits is normally ignored.

A region includes a set of contiguous image coefficients. The term coefficient is used hereinafter interchangeably with pixel, however, as will be well understood by a person skilled in the art, the former is typically used to refer to pixels in a transform domain (eg., a DWT domain).

1.1 Encoding Process of First SWEET Image Compression Method

Figure 3:
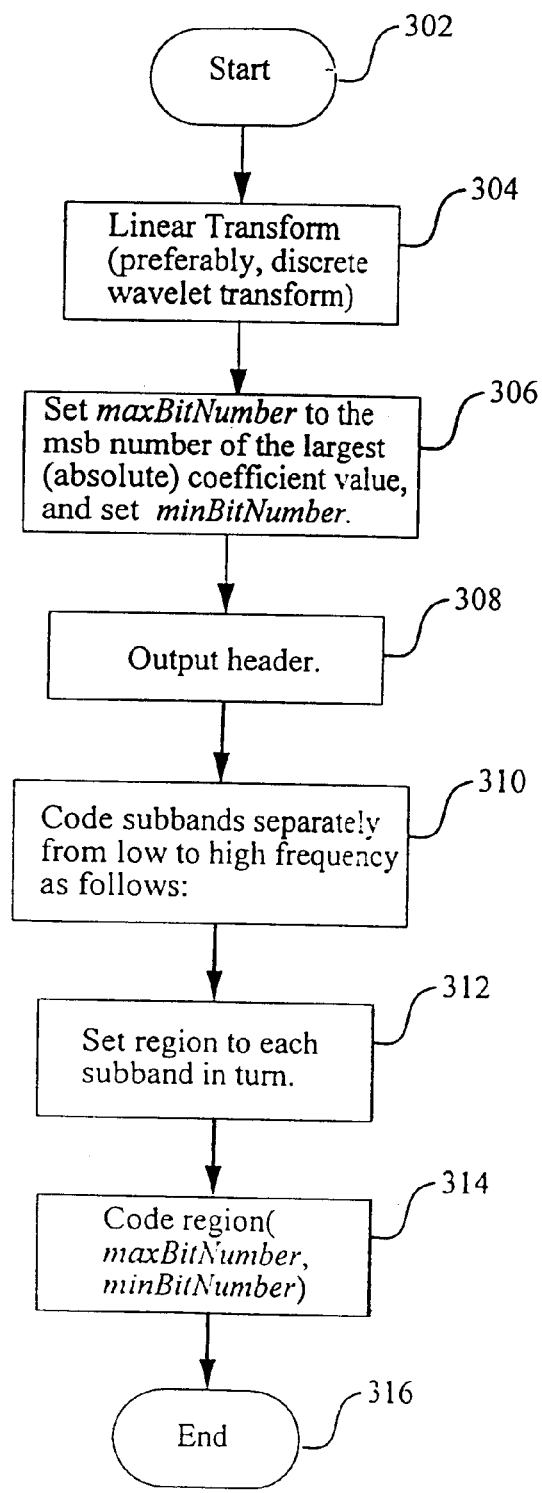
FIG. 3 is a flow diagram illustrating the method of representing, or encoding, an image described in the herein-mentioned patent application.
Figure 4:
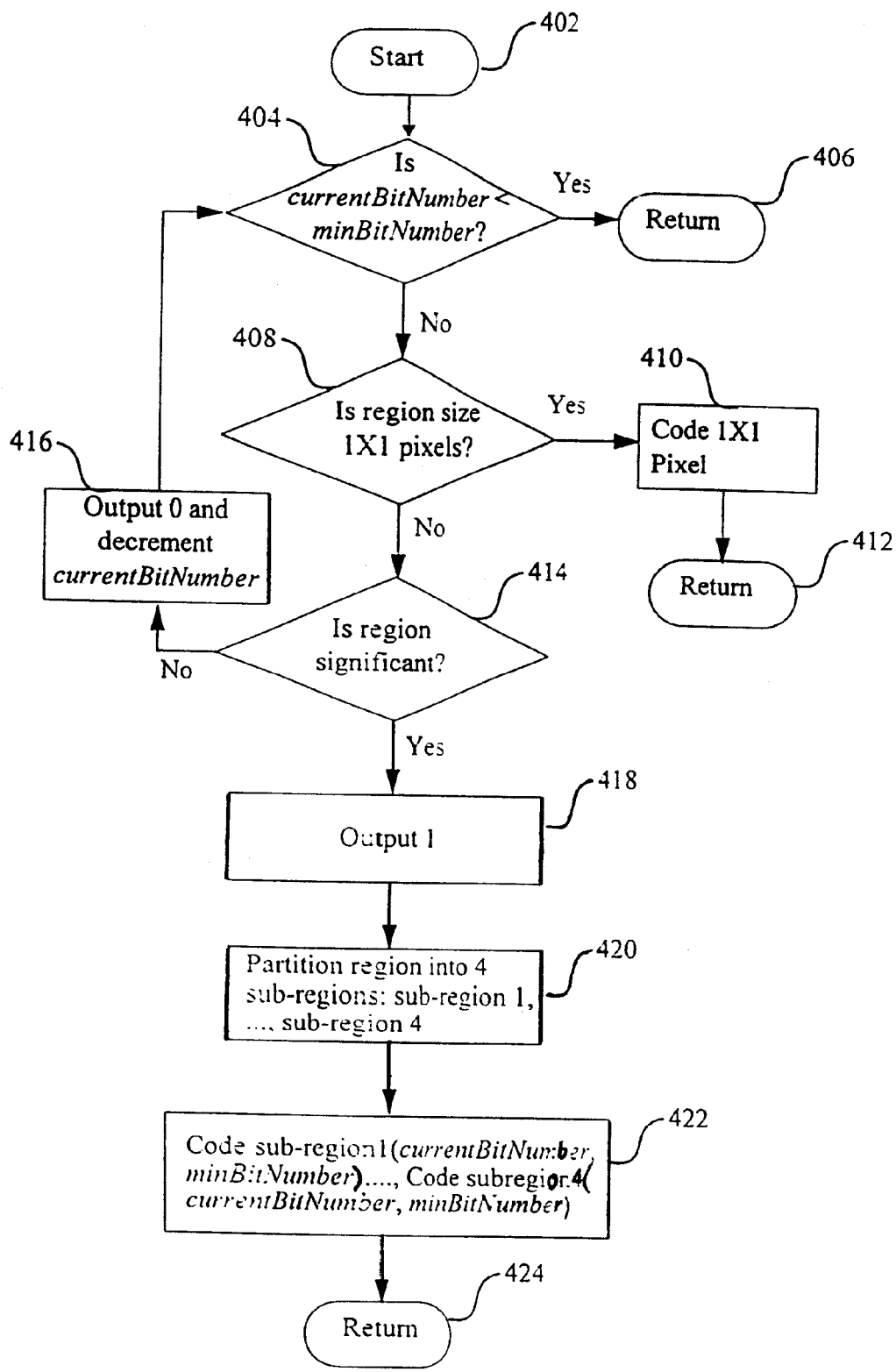
FIG. 4 is a detailed flow diagram illustrating the step of coding a region in FIG. 3.

A more detailed description of the first image compression method is provided with reference to FIGS. 3 and 4.

FIG. 3 is a flow diagram illustrating the first image encoding method. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients including the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308, which provides an output header in the coded representation of the input image. Thus, in a practical implementation, header information is output as part of the coded representation. For example, the output header may contain information about the source image, including the image height and width, the number of levels of the DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBitNumber as parameters. This provides a hierarchical code, since lower resolution versions of the image are coded into the bit stream before higher resolutions. Processing terminates in step 316.

FIG. 4 is a detailed flow diagram of the procedure "Code region(currentBitNumber, minBitNumber)" called in step 314 of FIG. 3 for coding each region, where maxBitNumber is provided as the currentBitNumber. In step 402, processing commences. The inputs to the region coding process of FIG. 4 include the currentBitNumber and minBitNumber parameters. Preferably, the method is implemented as a recursive technique where the process is able to call itself with a selected region or sub-region. However, the process may implemented in a non-recursive manner.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision block 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remaining bits above the minBitNumber in the coded representation. In step 412, processing returns to the calling procedure. Otherwise, if decision block 408 returns false (no), the region includes more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in R, \quad (1)$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber-1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm. The partitioning algorithm used is known to the decoder.

Figure 2:
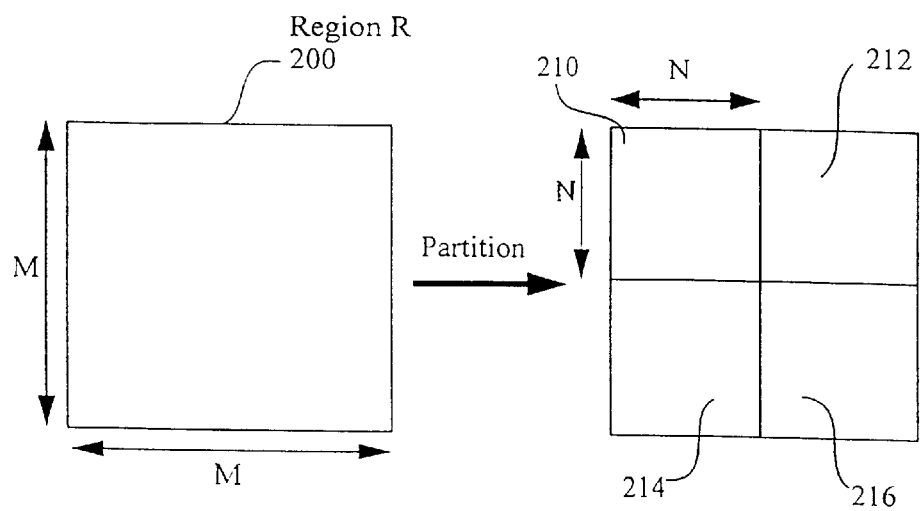
FIG. 2 is a diagram illustrating partitioning described in the herein-mentioned patent application.

In this method, square regions are used. A region is partitioned preferably into 4 equal-sized (square) subregions. As shown in FIG. 2, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and encode these partitions separately. In any case, this initialization has minimal effect on the overall results if done in an intelligent fashion. Alternatively, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 4. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits were non-zero. For example, if currentBitNumber=3, minBitNumber=1, then −9 (00001001) is coded as "1 0 0" followed by a sign bit "1".

1.2 Decoding Process of First SWEET Image Compression Method

Figure 5:
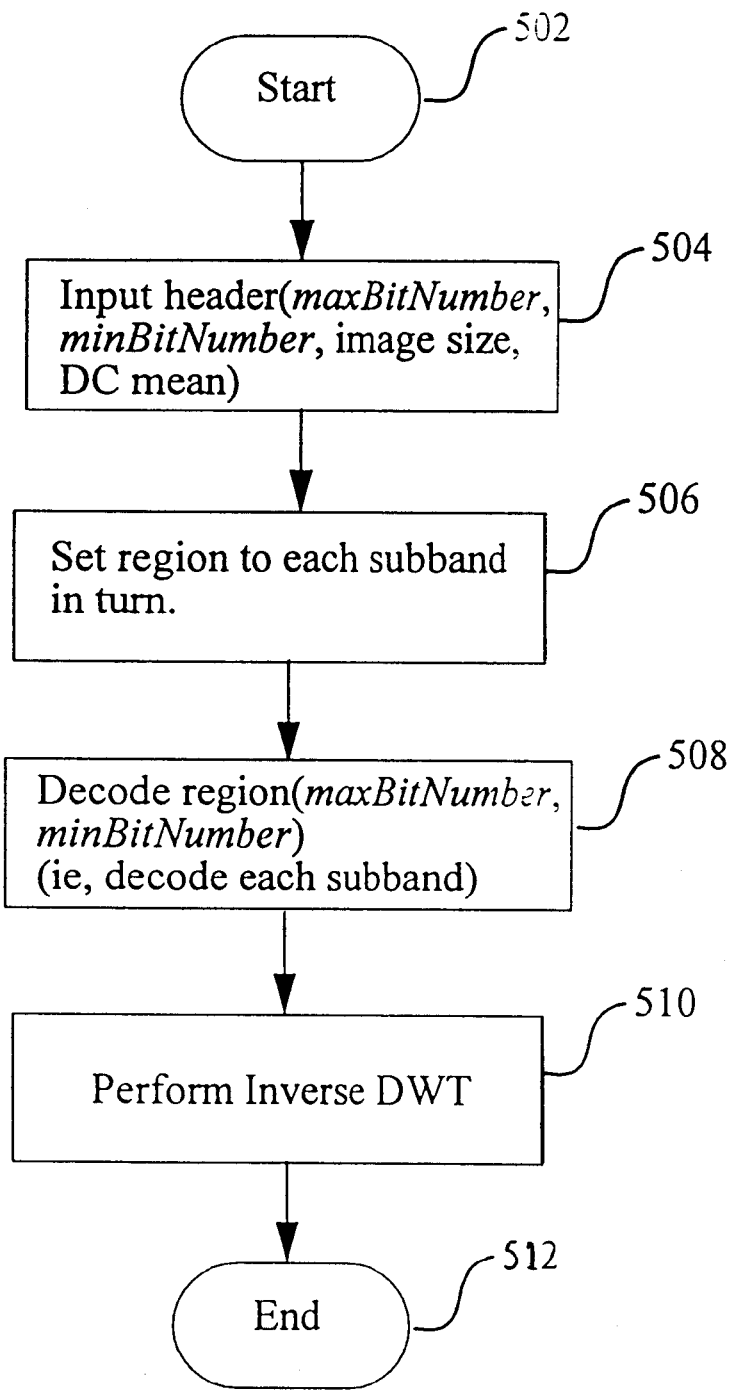
FIG. 5 is a flow diagram illustrating the method of decoding a coded representation of an image produced in accordance with the method FIG. 3.

FIG. 5 is a flow diagram illustrating a method of decoding the coded representation of an image obtained using the process of FIGS. 3 and 4. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In step 510, the inverse DWT is applied to the decoded selected region. Processing terminates in step 512.

Figure 6:
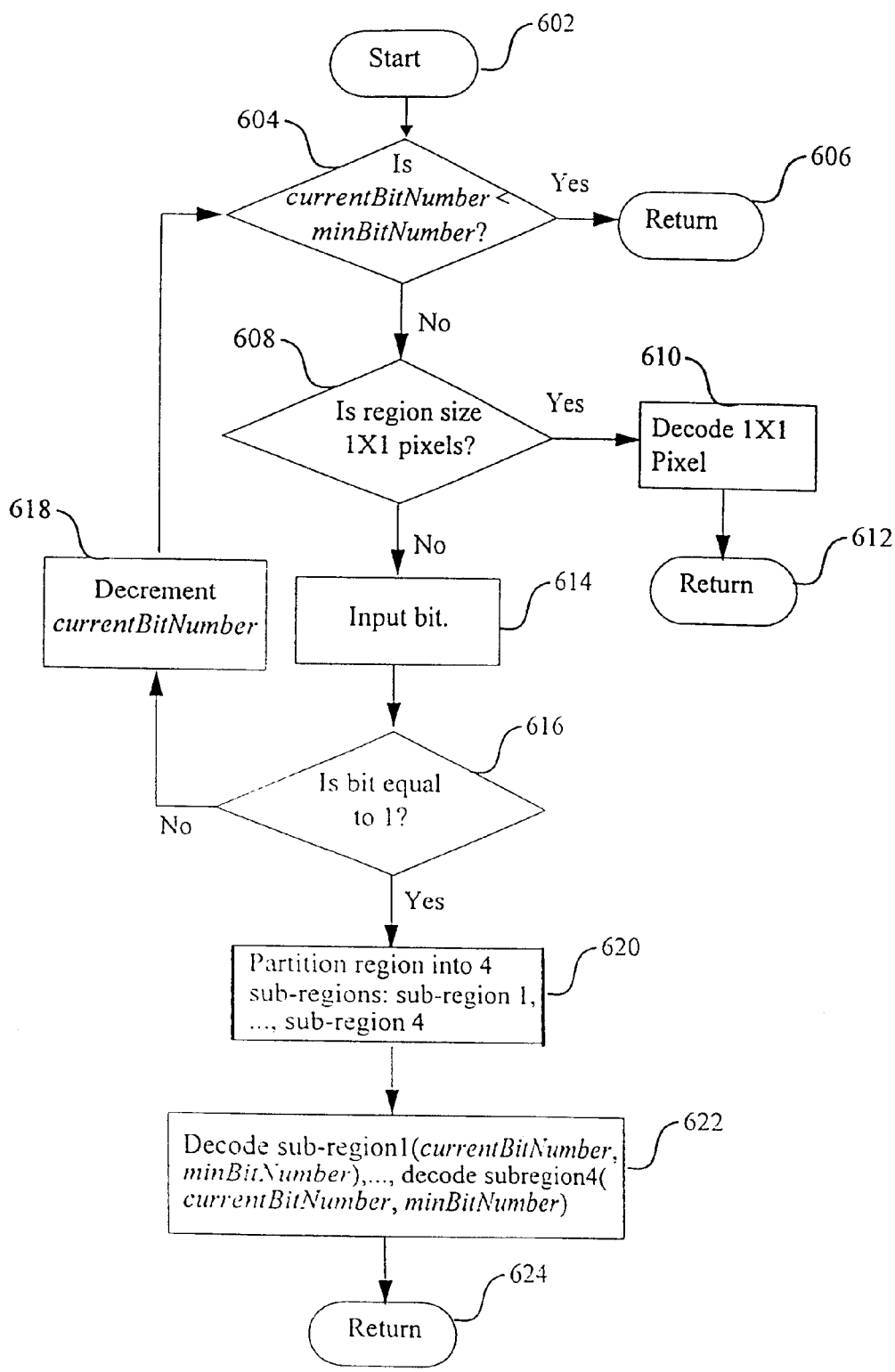
FIG. 6 is a detailed flow diagram illustrating the step of decoding a region in FIG. 5.

FIG. 6 is a detailed flow diagram of step 508 of FIG. 5 for decoding each region using procedure call "Decode region (currentBitNumber, minBitNumber)", where maxBitNumber is provided as the currentBitNumber. In step 602, processing commences. The inputs to the region decoding process of FIG. 6 are the currentBitNumber and minBitNumber parameters. Again, the method is preferably implemented as a recursive technique. However, the process can be implemented in a non-recursive manner.

In decision block 604, a check is made to determine if the currentBitNumber is less than the minBitNumber. If decision block 604 returns true (yes), processing continues at step 606, where processing returns to the calling procedure. Otherwise, if decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. This is carried out by means of a recursive call to the process illustrated in FIG. 6. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

1.3 Two-Dimensional Example

The method effectively codes the leading zeros of most transform coefficients, while coding the bits from the most significant bit to the predetermined least significant bit, specified by the parameter minBitNumber, and the sign simply as is. Thus, the compression method advantageously represents the leading zeros. This method is very efficient in certain situations, namely for coding discrete wavelet transform image coefficients, which typically exhibit a large dynamic range. A few coefficients typically have very large values, while most have very small values.

Figures 7A, 7B, 7C, 7D:
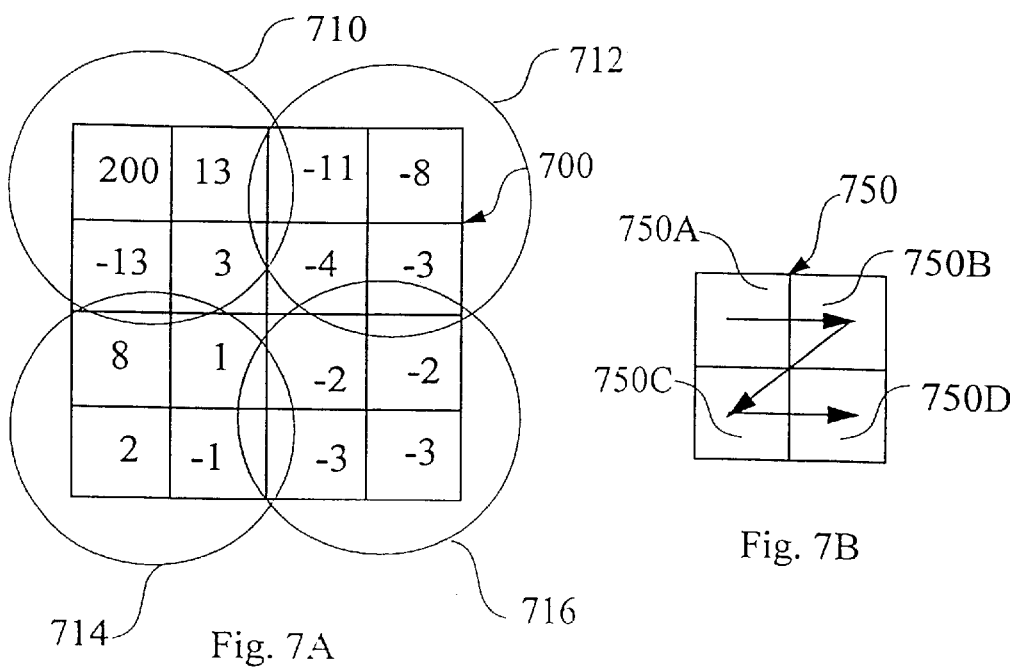
FIGS. 7A to 7D are diagrams illustrating the processing of a two-dimensional, eight-coefficient region in accordance with the encoding and decoding method of FIGS. 3 to 6.

An example of encoding a two-dimensional region including 4×4 coefficients is described with reference to FIGS. 7A to 7D. The processing of the 4×4 region 700 of FIG. 7A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7 (see decision block 404, 408, and 414 and step 418 of FIG. 4). The region 700 is then partitioned into four sub-regions (see step 420 of FIG. 4): the top left region 710, the top right region 712, the bottom left region 714 and the bottom right region 716 of FIG. 7A. Each of the subregions includes of 2×2 coefficients.

The sub-regions 710, 712, 714 and 716 of FIG. 7A are in turn coded in the predefined processing sequence shown of FIG. 7B, where a region 750 includes of four sub-regions 750A to 750D. The three arrows illustrated in the diagram indicate the order or sequence of processing, that is, top left sub-region 750A, top right sub-region 750B, bottom left sub-region 750C, and bottom right sub-region 750D, respectively.

The sub-region 710 of FIG. 7A is coded first (see step 422 of FIG. 4). For the currentBitNumber equal to 7, a one (1) is output in the coded representation. The sub-region 710 is then partitioned into four 1×1 pixels having decimal values 200, 13, −13 and 3. Each of these coefficients is coded by outputting the bits of each coefficient from the currentBitNumber=7 to the minBitNumber=3 (see decision block 408 and step 410 of FIG. 4). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$1 1 \underbrace{11001}_{200} \overset{sign\ bit}{\underset{}{0}} \underbrace{00001}_{13} \underbrace{00001}_{-13} 1 \underbrace{00000}_{3}.$$

The header information is not shown in the foregoing expression.

The top right sub-region 712 is then coded (per FIG. 7B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3. The sub-region 712 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000000001\ \underbrace{11}_{-11}\ \underbrace{11}_{-8}\ \underbrace{0}_{-4}\ \underbrace{0}_{-3}$$

The bottom left sub-region 714 is then encoded. A zero (0) is output for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respectively as binary value 1 with sign bit 0, and binary values 0,0 and 0 without sign bits.

Finally, the bottom right sub-region 716 having values −2, −2, −3, and −3 is coded. A zero (0) is output for each of currentBitNumber=7, 6, 5, 4 and 3 since the sub-region 716 is insignificant with respect to these bit numbers. No sign bits are output. Thus, the coded representation is as follows:
111100100000100000110000000001111100000011 000000000.

The decoder simply mimics the encoding process to reconstruct the region from the coded representation as depicted in FIG. 7C.

The decoding process can be made "smarter" in a number of ways. One such a "smarter" way is depicted in FIG. 7D. In this case, the magnitude of the non-zero coefficients is each increased by half of 2 to the power of minBitNumber. This is depicted in FIG. 7D. In this manner, the "smart" decoding processing generally reduces the mean square error between the decoded and the original coefficients. Still further, the encoder can alternatively perform this (type of) operation, thereby leaving the decoder to use the simplest depicted in FIG. 7C.

1.4 Encoding Process of Second SWEET Image Compression Method

A coding process according to an alternate method is hereinafter described with reference to FIGS. 9 to 12.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localized and therefore are generally efficient when implemented using computer systems.

Figure 9:
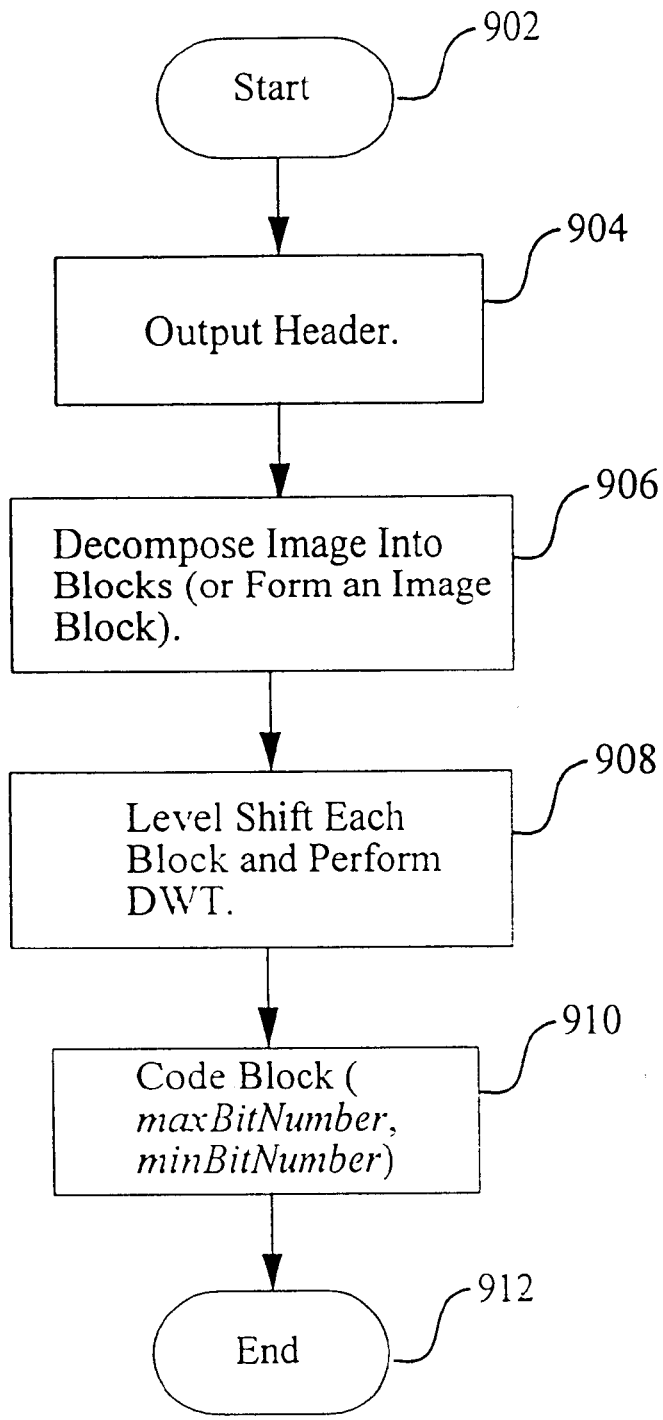
FIGS. 9 to 12 are flow diagrams illustrating an alternate method representing, or encoding, an image described in the herein-mentioned patent application.

FIG. 9 is a flow diagram illustrating the block-based encoding process according to the second encoding method. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBit-Number can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 10:
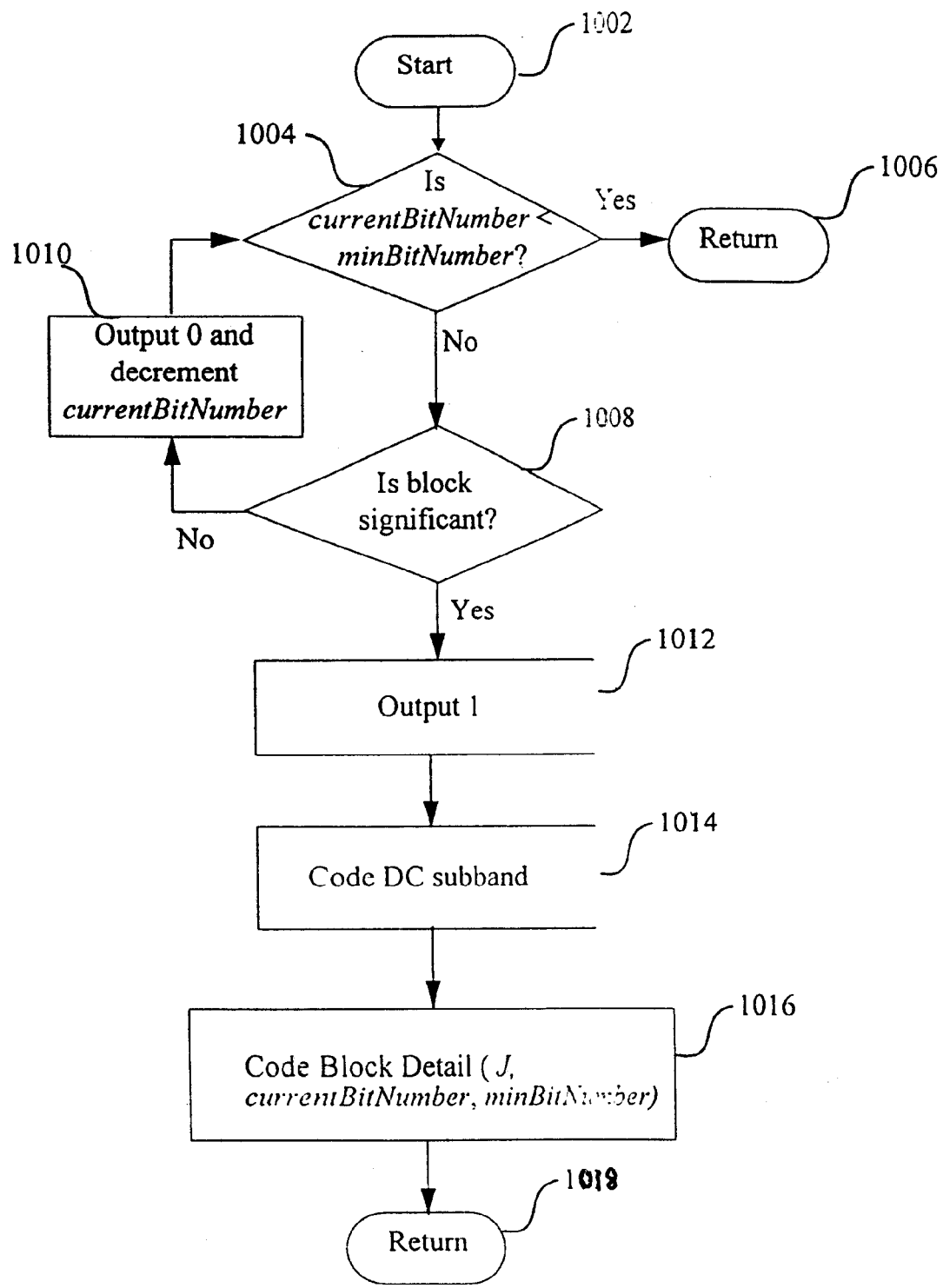

Step 910 for coding a block is illustrated in detail in the flow diagram of FIG. 10. The inputs to the block coding process of FIG. 10 include the currentBitNumber and the minBitNumber parameters. With reference to step 910 of FIG. 9, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalized) quadtree segmentation to find all coefficients with an MSB number greater than the minBitNumber. If the block is significant, it is partitioned into two "sub-blocks": the DC subband coefficients and the block including the remaining coefficients, referred to as the "block detail" for level J since it represents the high frequency information about the block of level J at all lower levels.

Figure 12:
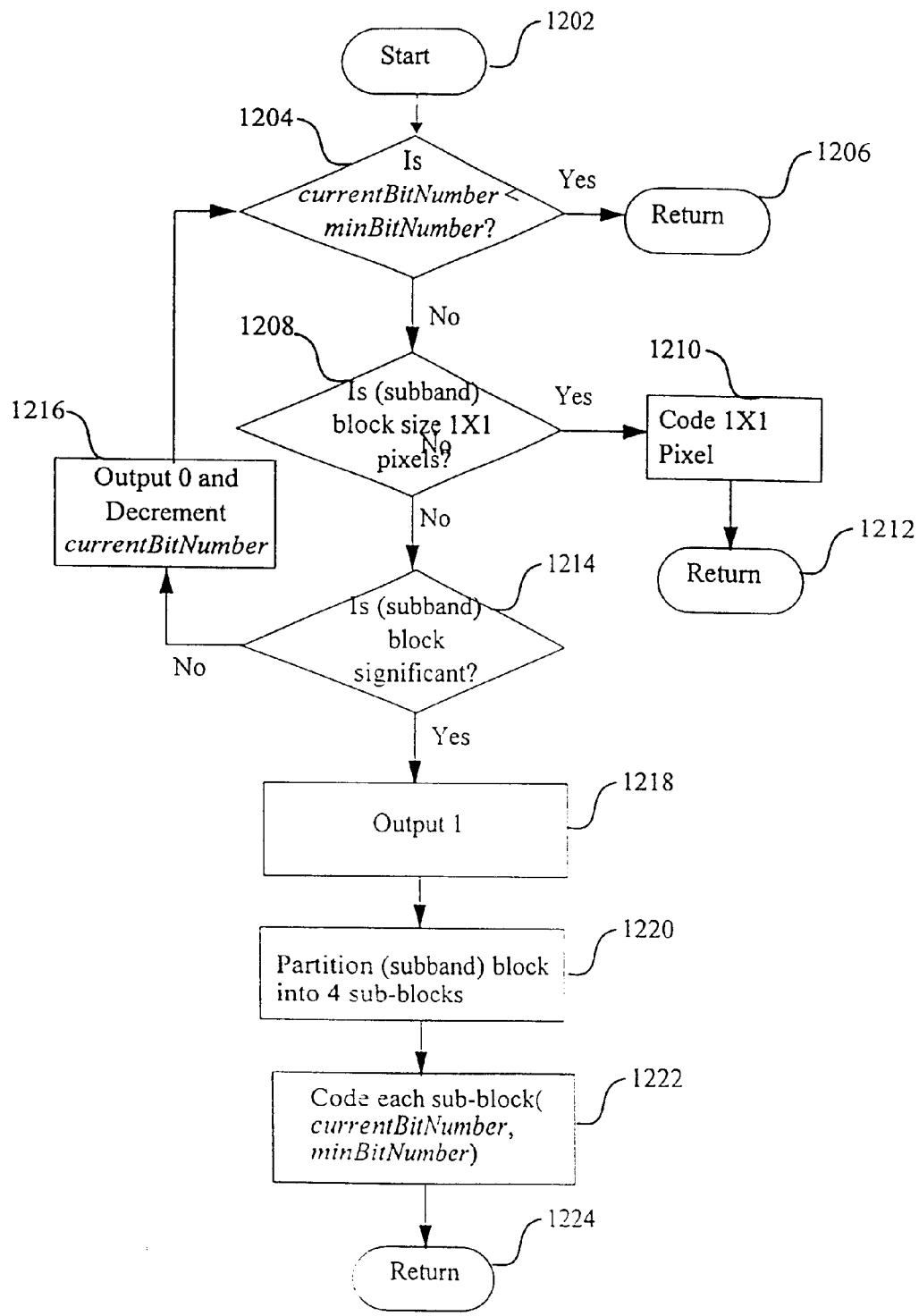

Step 1014 of FIG. 10 for coding the DC subband is illustrated in detail by the flow diagram of FIG. 12. That is, FIG. 12 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 12. In step 1224, execution returns the calling procedure.

Thus, in the process of FIG. 12, a subband or sub-block thereof is coded. The largest MSB number is isolated as before. If the sub-block includes only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 11:
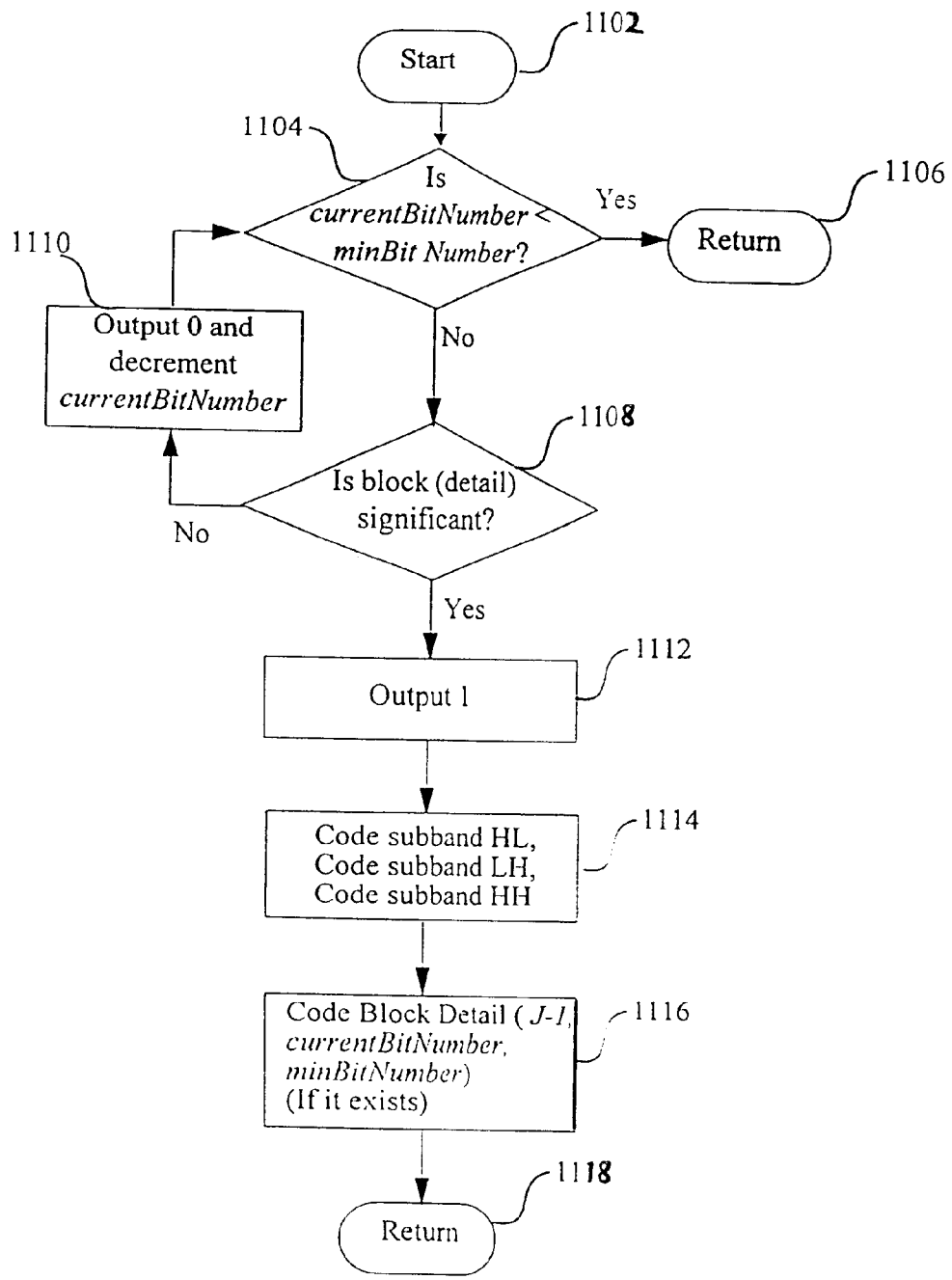

Step 1016 of FIG. 10 for coding block detail is illustrated by the flow diagram of FIG. 11. In step 1102, processing commences. In decision block 1104, a check is made to determine if the currentBitNumber is less than the minBitNumber. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J−1, currentBitNumber and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J−1 (if J−1 is greater than 0). This partitioning approach is motivated by the so-called 1/f type spectral models.

The decoding process for the second method can be implemented by mimicking the coding process described with reference to FIGS. 9 to 12.

The encoding and decoding methods and apparatuses represent digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the methods and apparatuses represent (or code) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the methods include the depth first nature of the coding. Further, in the case of coding subbands, the advantageous aspects of the method include hierarchical coding of each subband separately.

2. Preferred Embodiment(s) of Method

Figure 13:
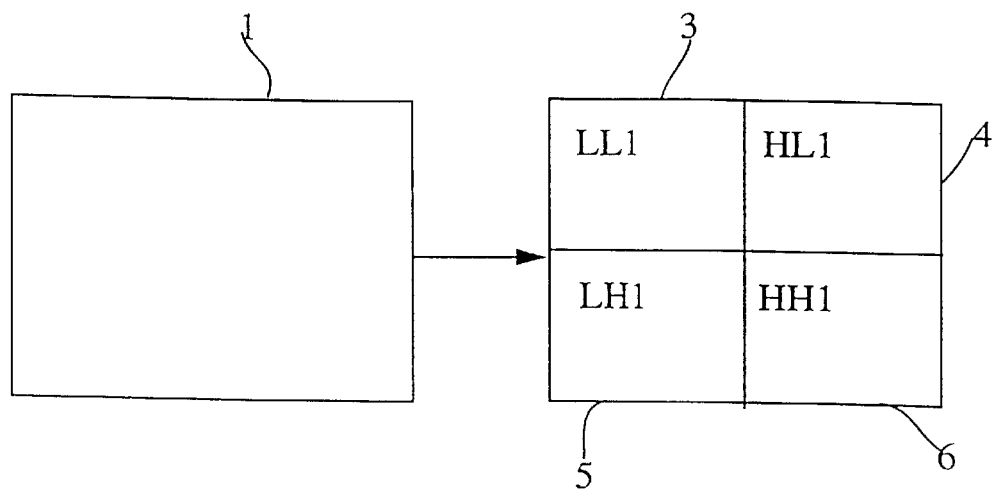
FIGS. 13–15 illustrate the process of wavelet transforming image data.

The preferred embodiment proceeds initially by means of a wavelet transform of image data. A description of the wavelet transform process is given in many standard texts and in particular the aforementioned book by Stollnitz et. al. An overview of the standard wavelet process will now be described with reference to the accompanying drawings. Referring initially to FIG. 13, an original image 1 is transformed utilising a Discrete Wavelet Transform (DWT) into four subimages 3–6. The subimages or subbands are normally denoted LL1, HL1, LH1 and HH1. The one suffix on the subband names indicates level 1. The LL1 subband is a low pass decimated version of the original image.

Figure 14:
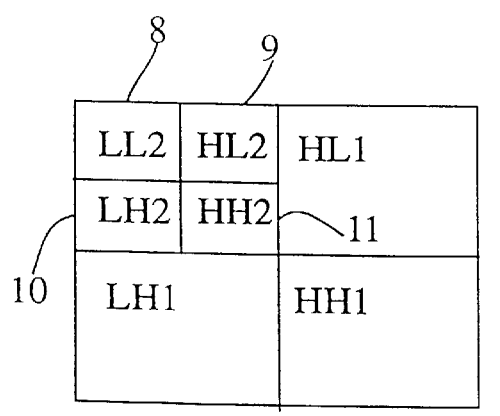
Figure 15:
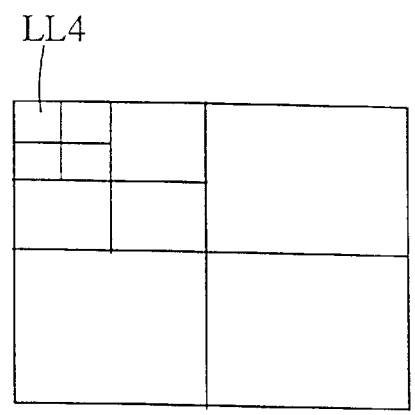

The wavelet transform utilised can vary and can include, for example, Haar basis functions, Daubechies basis functions etc. The LL1 subband is then in turn utilised and a second Discrete Wavelet Transform is applied as shown in FIG. 14 giving subbands LL2 (8), HL2 (9), LH2 (10), HH2 (11). This process is continued for example as illustrated in FIG. 15 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image. Thus a J-level DWT can be inverted as a series of J-single level inverse DWT's.

An image coded hierarchically can proceed by coding the DC subband. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. Hence, they often include a sparse array of values and substantial compression can be achieved by quantisation of the subbands and efficient encoding of their sparse matrix form.

Figure 16:
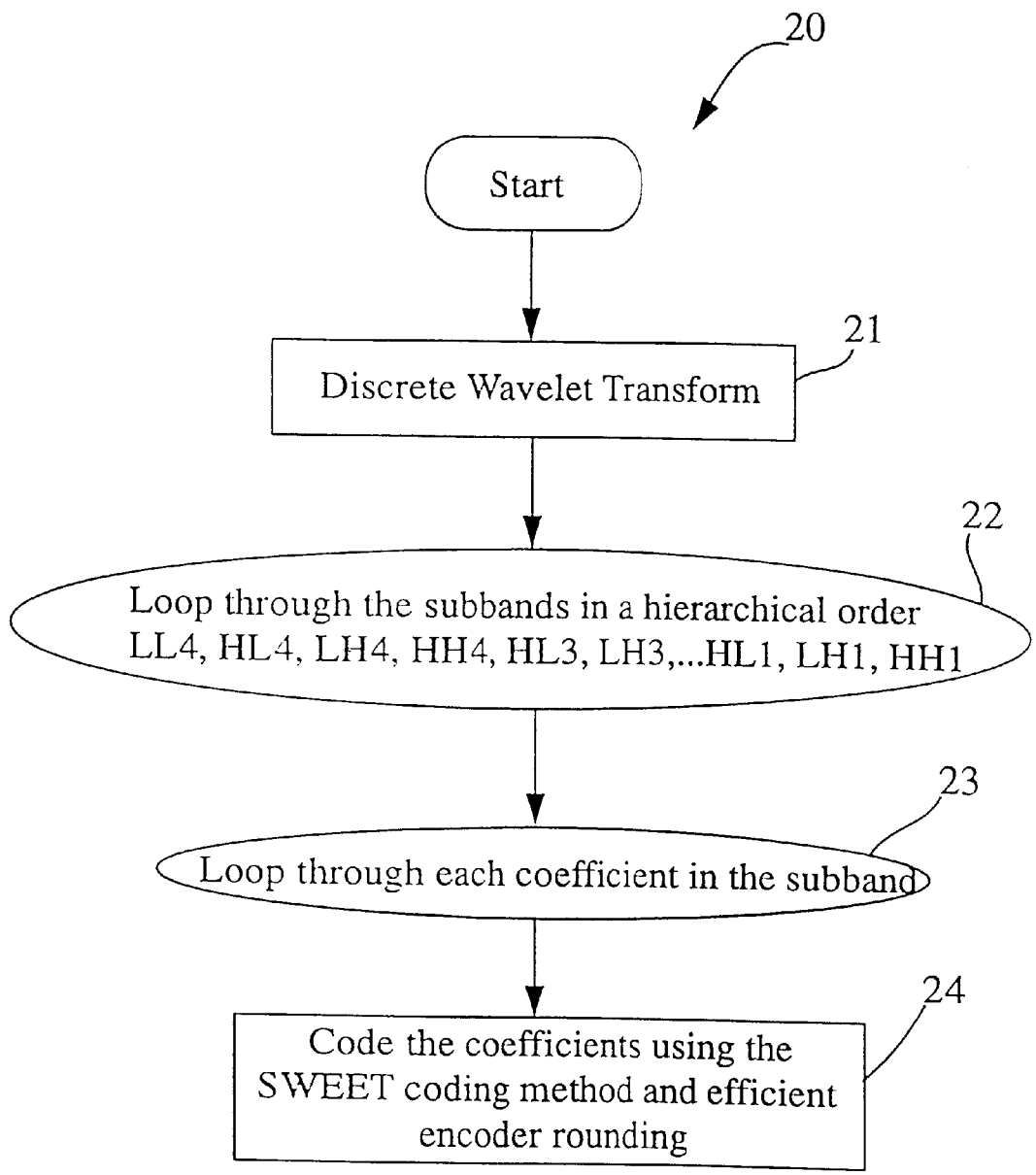
FIG. 16 illustrates a flow chart of the encode operation.

Turning now to FIG. 16, there is illustrated a flow chart 20 of the preferred embodiment which includes initially of taking a discrete wavelet transform 21 of the input image data as previously described. Next, each of the subbands are processed 22 in a hierarchical order. Next, the coefficients of each subbands are examined 23. The coefficients are encoded 24 utilising the aforementioned SWEET coding method with the efficient encoding modification to take into account rounding effects as will be described hereinafter.

Figure 17:
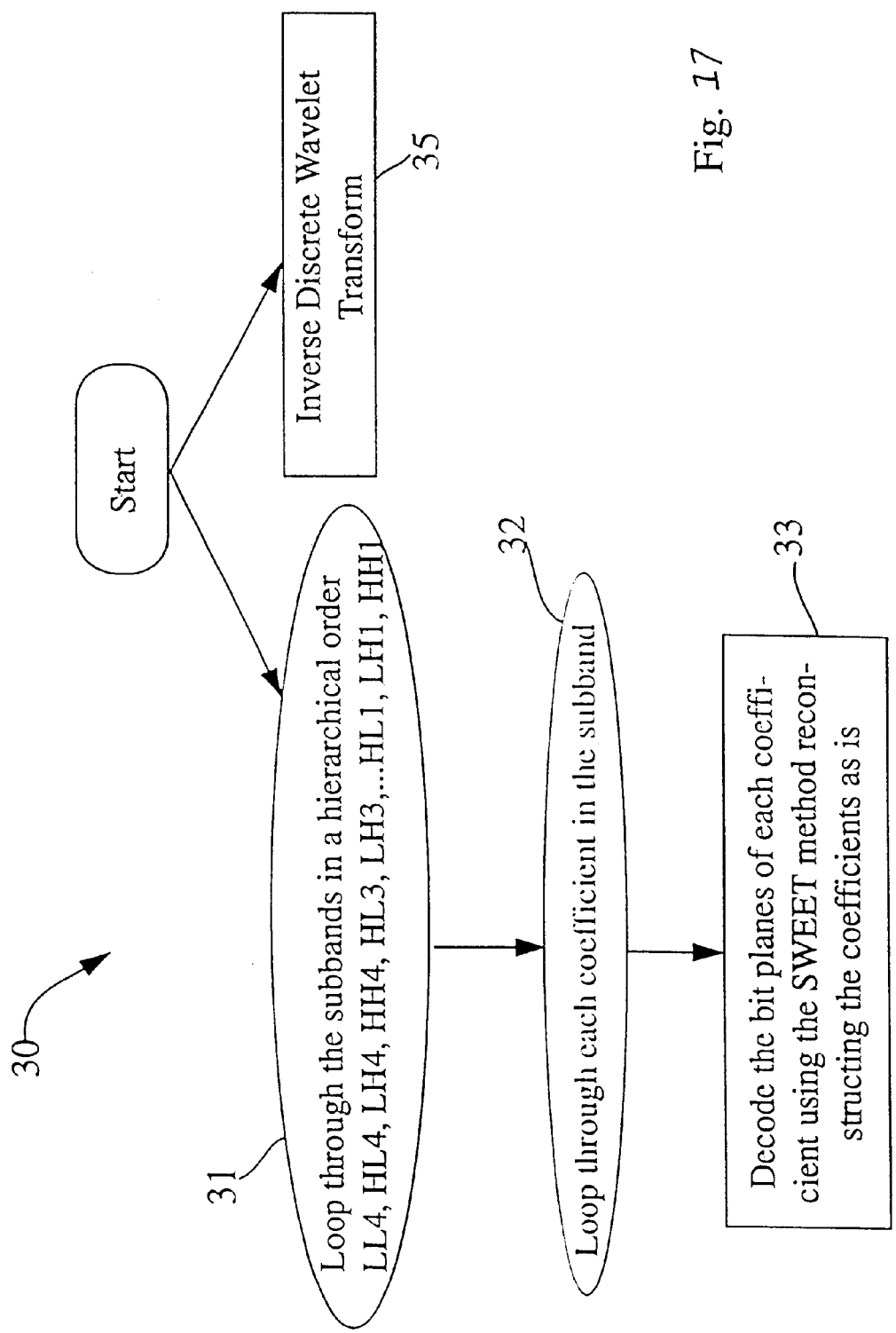
FIG. 17 illustrates a flow chart of the decode operation.

Turning now to FIG. 17, there is illustrated the decoding process 30 which applies the reverse process to the encoder. The decoder process 30 includes looping through each of the subbands in a hierarchal order 31. For each subband, each of the coefficients is examined 32. The bit planes of each coefficient are then decoded 33 utilising the SWEET method of reconstruction of the coefficient as is. Subsequently, once the coefficients have been decoded, an inverse discrete wavelet transform 35 is applied to reproduce the original data.

The SWEET coding method, described herein and in the aforementioned Australian Provisional Specification No. PO4728 is used to encode and decode the DWT subband coefficients. SWEET is a bit plane coding method, that is: a set of coefficients are effectively coded by simply coding the bit planes of the data set. For example, in FIG. 18 there is illustrated a table 40 showing a group of 4 numbers (135, 7, 191, 99) and a decimal form 41 in addition to an 8-bit binary representations 42. Bit plane coding can simply encode this group by implicitly or explicitly coding bit plans 7, 6, 5, 4 . . . down to a predetermined minimum bit plane number. There are various ways of performing this bit plane coding. For example, say the minimum bit plane number was 3, below which no data is to be transmitted, then one option is to code all the bits in bit plane 7 (explicitly as 1010), then all the bits in bit plane 6 (0001) and so on until all the bits in bit plane 3 are encoded. Alternatively, one can code the bits of coefficient 135 (10000), followed by all the bits from bit plane 7 to bit plane 3 for the coefficient 7 (0000), followed by all the bits from bit plane 7 to bit plane 3 for the coefficient 191 (10111) (0000) and so on. However, the actual order of coding chosen is irrelevant as far as the description of the efficient rounding method of the preferred embodiment is concerned.

Figure 18:
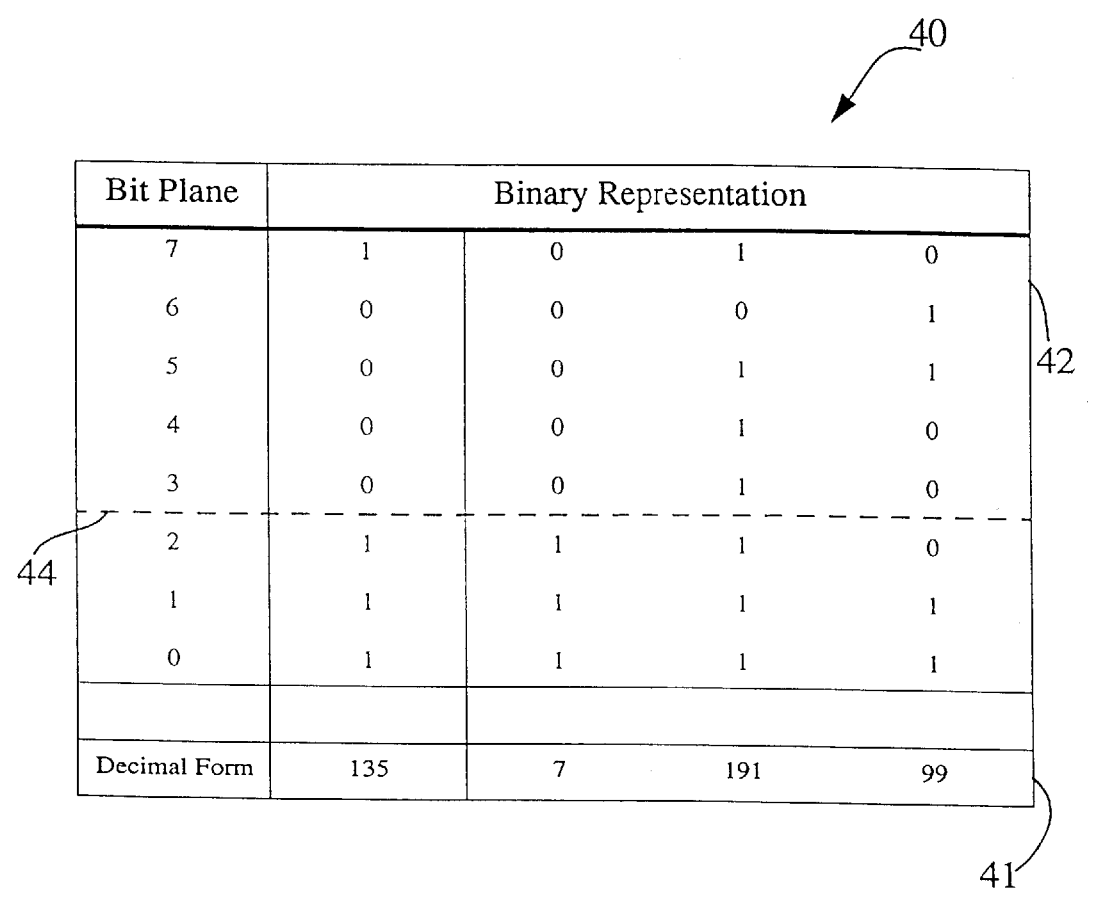

If the minimum bit plane number is bit plane 0, then, for integer coefficients, the coefficients are losslessly coded. However, for lossy image compression applications the minimum bit plane number is usually larger than this, and the coefficients are not usually integers and hence, some losses will occur. In the example of FIG. 18, the minimum bit plane was bit plane 3. In this case, all the bits 42 from bit plane 7 to bit plane 3 are coded(at least implicitly) and sent by the encoder to the decoder. The decoder then reconstructs these coded bit planes 42 exactly, and in a simple case, fills the remaining bit planes (bit planes 2, 1 and 0) with zeros.

In the preferred embodiment, two techniques are applied to improve the coding efficiency over the simplistic approach described above. One can first employ a form of rounding at the decoder or rounding at the encoder, which is in fact uniform quantisation. To perform rounding at the decoder, if a coefficient has been coded down to bit plane $n_{min}$, then a 1 in bit plane $n_{min}-1$ can be added to the coefficient to reduce the average error. Applying this to the exmaple of FIG. 18 the results are as illustrated in FIG. 19. The coefficient 135 is decoded simplistically as 128, but adding a 1 in bit plane 2 means that it is decoded as 132. The error between the original coefficient and the decoded coefficient is in the simplistic case is 7, while in the example of FIG. 19 is only 3.

As refinement, when rounding at the encoder only coefficients that are not coded to zero are rounded. A coefficient is coded to zero if is most significant bit is in a bit plane less than the minimum coded bit plane. For example, in column 51, the number 7 has resulted in the higher bit planes remaining unchanged.

Before coding the bit planes, where the minimum coded bit plane is bit plane $n_{min}$, we can add a 1 in bit plane $n_{min}-1$. To repeat the example of FIG. 18 and 19 adding a 1 in bit plane 2 for the coefficient 135 decimal (45) gives (10000111+00000100=10001011 binary) 139 decimal (52 of FIG. 19). The coder then codes the bit planes to $n_{min}$ (53) as before and the decoder simply fills uncoded bit planes with zeros. Thus 135 is decoded as (10001000) 136.

Figure 20:
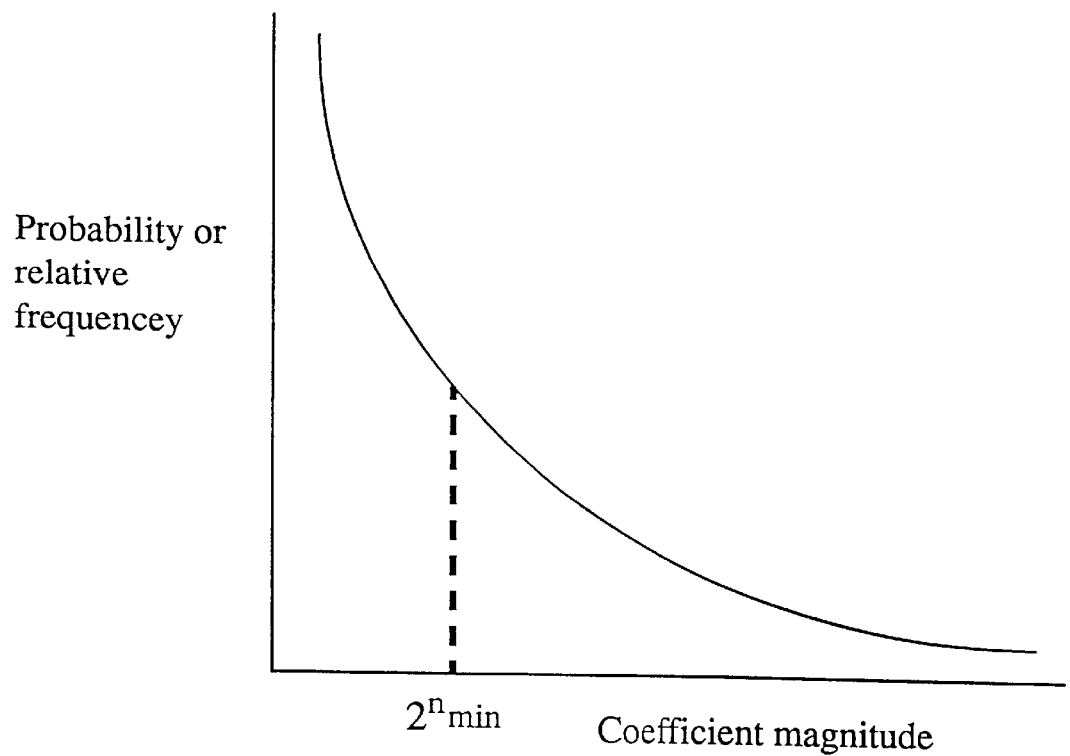
FIG. 20 illustrates a typical distribution of the magnitude of transform image coefficients.

The significant amount of compression for typical imagery or data relies on the fact that a typical transform of the image has a magnitude distribution that is heavily skewed toward zero. This is illustrated conceptually in FIG. 20 which shows that the probability of a coefficient having a small magnitude is high, while the probability of having a large magnitude rapidly decreases with increasing magnitude. FIG. 20 further illustrates that for most values of $n_{min}$ there is a large number of coefficients below $2^{n_{min}}$.

Using a bit plane coding technique a significant amount of compression is possible since most of the coefficients are coded as zero (that is they have a magnitude less than $2^{n_{min}}$. The SWEET coding method, and almost all efficient image coding methods, code the large number of zero (coded) coefficients in an efficient manner, typically with a fraction of a bit per zero (coded) coefficient. Also illustrated in FIG. 20 is fact that typically there are a significant number of coefficients with magnitude less than $2^{n_{min}}$ but close to $2^{n_{min}}$ in comparison to the number of coefficients with magnitude greater than $2^{n_{min}}$. This means that no matter what the minimum bit plane $n_{min}$ is, normal rounding before bit plane encoding will significantly increase the number of coefficients that are not coded to zero (as compared to the case where round is not carried out before encoding. All the coefficients less than $2^{n_{min}}$ but greater than $2^{(n_{min}-2)}$) will be rounded up to $2^{n_{min}}$ and subsequently will not be coded to zero). Although the ensuing coding distortion decreases, through more accurate decoding, the compression ratio will be significantly less since this process results in significantly more non-zero coefficients (the effectiveness of the SWEET method and most other methods is significantly reduced with more non-zero coded coefficients).

Thus for image compression applications, rounding prior to bit plane encoding, as described previously, is not generally desirable. However, with knowledge of the particular bit plane encoding scheme it is possible to perform an efficient form of rounding prior to bit plane encoding. If a coefficient is not coded to zero then it is possible to add the 1 bit in bit plane $n_{min}^{-1}$, leaving the same number of zero coefficients (coefficients coded to zero).

Further refinements can be made for coding method such as SWEET, (and for certain variation on the EZW coding method). Sometimes when a 1 in bit plane $n_{min}-1$ is added to a coefficient the bit plane number of the most significant bit of a coefficient increases by one (as for example when 00000100 is added to 00000111 to give 00001011). This is sometimes undesirable, in that the efficient bit plane coding schemes, such as SWEET, generally rely on the efficient coding of the leading zeros (the zero bits above the most significant bit) of a coefficient or a group of coefficients and this can effect the compression efficiency. With SWEET (and with certain variations of the EZW coding method), the leading zeros of a two by two block of coefficients are coded efficiently.

To illustrate the point consider an example 2×2 block of coefficients as shown in FIG. 21 (in a one dimensional form). The zero bit planes above bit plane 4 are not shown since using a method like SWEET (or EZW) these bit planes would be efficiently encoded. Having efficiently coded these leading zeros SWEET simply codes the other bit planes as is. For example with $n_{min}=3$ (60), bit planes 4 and 3 are coded as is (1001 and 0011), requiring 4 bits per plane or 8 bits in total. A 1 bit is added in bit plane 2 to each coefficient only if the bit plane number of the most significant bit does not then exceed bit plane number 4. Thus a 1 in bit plane 2 is added to the coefficients 16, 7 and 14 which are then encoded/decoded as 16, 8 and 16. The 1 bit in bit plane 2 is not added 29 since this would then put the most significant bit in bit plane 5, thus effecting the efficiency of the coding of the leading zeros.

It should be noted that 7, which would be coded to zero when using the previous form of decoder rounding, is now coded to 8. Although this form of rounding prior to bit plane encoding increases the number of non-zero coded coefficients, it does so in such a way that does not significantly effect the compression ratio. In the example given above bit planes 4 and 3 need to be coded for the coefficient 7 in any case, so there is little extra cost in rounding. (For signed data we need to send the sign bit of a non-zero coded coefficient and thus coding 7 as 8 does require one extra bit for the sign). There are many other coefficients where rounding up will significantly effect the compression ratio, and hence rounding is not done is these cases. Thus for typical transform image coefficients this form of rounding is generally superior to rounding at the decoder. Further it can be done on simply in hardware at the encoder, and is thus very simple to implement. When a coefficient is coded it is simple to test whether adding a 1 bit in bit plane $n_{min}-1$ will increase the bit plane number of the most significant bit of a coefficient, beyond a given desired maximum. The decoder is also very simple: it merely reconstructs the bits sent by the encoder and (implicitly) fills the remaining lower order bit planes with zeros.

2.1 Preferred Embodiment of Apparatus(s)

Figure 8:
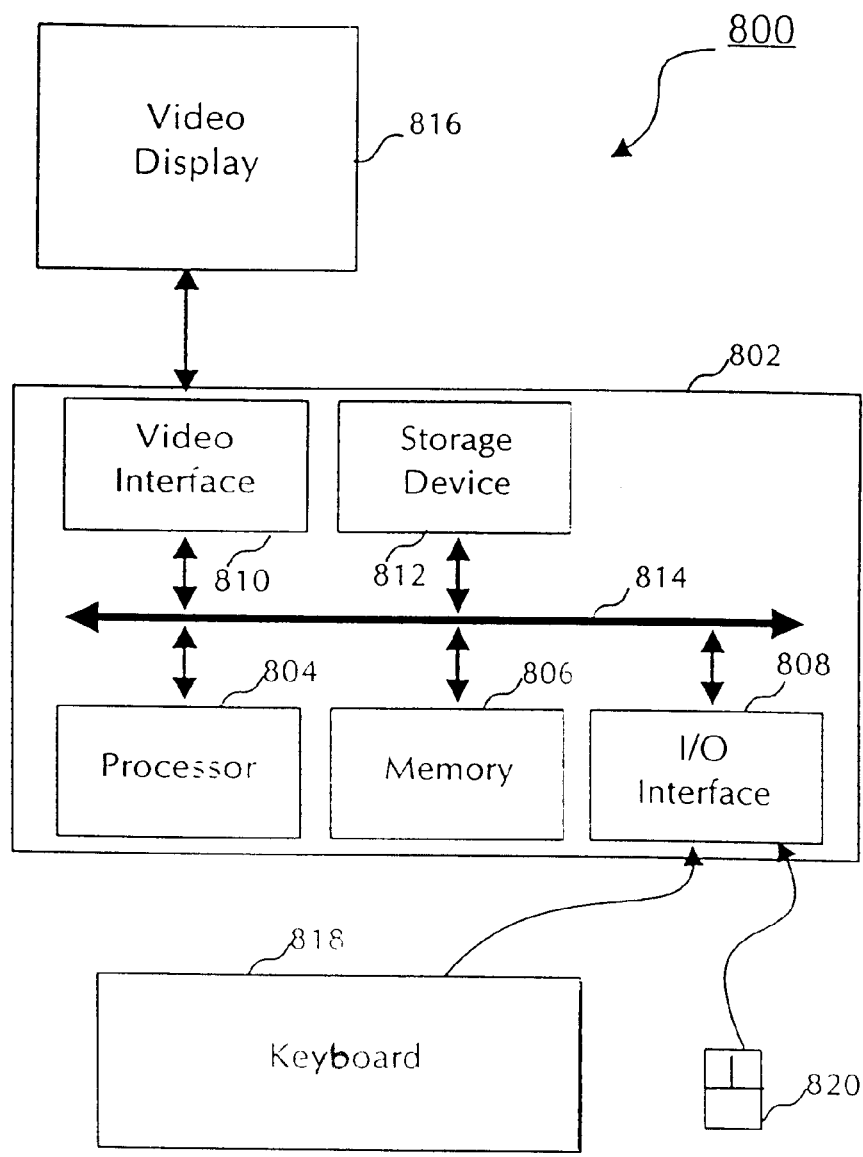
FIG. 8 is a block diagram of a general purpose computer.

The encoding process is preferably practiced using a conventional general-purpose computer, such as the one shown in FIG. 8, wherein the processes of FIG. 13 to 21 may be implemented as software executing on the computer. In particular, the steps of the encoding method is effected by instructions in the software that are carried out by the computer. The software may be divided into two separate parts; one part for carrying out the encoding method; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding representations of digital images in accordance with the embodiments of the invention.

The computer system 800 includes of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808c using an appropriate communication channel 830 such as a modem communications path, a computer network, or the like. The computer network may include a local area network (LAN), a wide area network (WAN), an Intranet, and/or the Internet The computer 802 itself includes of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can include of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can include of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of coding alternatively be implemented in dedicated hardware such as one or more integrated circuits performing the functions or sub functions of the encoding. Such dedicated hardware may include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

What is claimed is:

1. A method of encoding data including the steps of:
   transforming the data into a series of coefficients, wherein each said coefficient is represented as a binary string comprising a plurality of bits;
   quantizing the coefficients, wherein the quantizing step performs the following sub-steps for each said coefficient;
   determining a bitplane number of a most significant bit of a current coefficient; and
   adding a '1' bit to said current coefficient at a bitplane below a predetermined minimum bitplane if and only if the determined bitplane number is greater than or equal to the predetermined minimum bitplane; and
   encoding the bits of the coefficients from a predetermined maximum bitplane to the predetermined minimum bitplane.

2. A method as claimed in claim 1, wherein said adding step comprises:
   adding a '1' bit to said current coefficient at that bitplane one below a predetermined bitplane if and only if the determined bitplane number is greater than or equal to the predetermined minimum bitplane.

3. A method of encoding data including the steps of:
   transforming the data into a series of coefficients, wherein each said coefficient is represented as a binary string comprising a plurality of bits;
   dividing the series of coefficients into predetermined blocks each comprising at least one said coefficient;
   quantizing the coefficients in each said block, wherein the quantizing step performs the following sub-step for each block:
   determining a bitplane number of a most significant bit of the largest magnitude coefficient in a current block; and wherein the quantizing step performs the following sub-step for each coefficient of the current block;
   adding a '1' bit to a current coefficient at a bitplane below a predetermined minimum bitplane if and only if the adding step does not increase the bitplane number of the most significant bit of the current coefficient beyond the determined bitplane number; and encoding the bits of said coefficients from a predetermined maximum bitplane to the predetermined minimum bitplane.

4. A method as claimed in claim 3, wherein said adding step comprises:
adding a '1' bit to a current coefficient at that bitplane one below a predetermined minimum bitplane if and only if the adding step does not increase the bitplane number of the most significant bit of the current coefficient beyond the determined bitplane number.

5. A method as claimed in claim 3, wherein said transform includes a wavelet transform.

6. A method as claimed in claim 3, wherein said data includes digital image data.

7. An apparatus for encoding data, the apparatus including:
transformation means for transforming the data into a series of coefficients, wherein each said coefficient is represented as a binary string comprising a plurality of bits;
quantization means for quantizing the coefficients, wherein the quantization means comprises:
determination means for determining a bitplane number of a most significant bit of a current coefficient; and
addition means for adding a '1' bit to said current coefficient at a bitplane below a predetermined minimum bitplane if and only if the determined bitplane number is greater than or equal to the predetermined minimum bitplane; and
encoder means for encoding the bits of the coefficients from a predetermined maximum bitplane to the predetermined minimum bitplane.

8. An apparatus as claimed in claim 7, wherein said addition means adds a '1' bit to said current coefficient at that bitplane one below a predetermined minimum bitplane if and only if the determined bitplane number is greater than or equal to the predetermined minimum bitplane.

9. An apparatus for encoding data, the apparatus including:
transformation means for transforming the data into a series of coefficients, wherein each said coefficient is represented as a binary string comprising a plurality of bits;
division means for dividing the series of coefficients into predetermined blocks each comprising at least one said coefficient;
quantization means for quantizing the coefficients in each said block, wherein the quantization means comprises:
determination means for determining a bitplane number of a most significant bit of the largest magnitude coefficient in a current block; and
addition means for adding a '1' bit to a current coefficient of the current block at a bitplane below a predetermined minimum bitplane if and only if the addition does not increase the bitplane number of the most significant bit of the current coefficient beyond the determined bitplane number; and
encoder means for encoding the bits of said coefficients from a predetermined maximum bitplane to the predetermined minimum bitplane.

10. An apparatus as claimed in claim 9, wherein said addition means adds a '1' bit to a current coefficient of the current block at that bitplane one below a predetermined minimum bitplane if and only if the addition does not increase the bitplane number of the most significant bit of the current coefficient beyond the determined bitplane number.

11. A computer program product as claimed in claim 10, wherein said transform includes a wavelet transform.

12. A computer program product as claimed in claim 10, wherein said data includes digital image data.

13. An apparatus as claimed in claim 9, wherein said transform includes a wavelet transform.

14. An apparatus as claimed in claim 9, wherein said data includes digital image data.

15. A computer program product including a computer readable medium having recorded thereon a computer program for encoding data, the computer program product including:
transformation means for transforming the data into a series of coefficients, wherein each said coefficient is represented as a binary string comprising a plurality of bits;
quantization means for quantizing the coefficients, wherein the quantization means comprises:
determination means for determining a bitplane number of a most significant bit of a current coefficient; and
addition means for adding a '1' bit to said current coefficient at a bitplane below a predetermined minimum bitplane if and only if the determined bitplane number is greater than or equal to the predetermined minimum bitplane; and
encoder means for encoding the bits of the coefficients from a predetermined maximum bitplane to the predetermined minimum bitplane.

16. A computer program product as claimed in claim 15, wherein said addition means adds a '1' bit to said current coefficient at that bitplane one below a predetermined minimum bitplane if and only if the determined bitplane number is greater than or equal to the predetermined minimum bitplane.

17. A computer program product including a computer readable medium having recorded thereon a computer program for encoding data, the computer program product including:
transformation means for transforming the data into a series of coefficients, wherein each said coefficient is represented as a binary string comprising a plurality of bits;
division means for dividing the series of coefficients into predetermined blocks each comprising at least one said coefficient;
quantization means for quantizing the coefficients in each said block, wherein the quantization means comprises:
determination means for determining a bitplane number of a most significant bit of the largest magnitude coefficient in a current block; and
addition means for adding a '1' bit to a current coefficient of the current block at a bitplane below a predetermined minimum bitplane if and only if the addition does not increase the bitplane number of the most significant bit of the current coefficient beyond the determined bitplane number; and
encoder means for encoding the bits of said coefficients from a predetermined maximum bitplane to the predetermined minimum bitplane.

18. A computer program product as claimed in claim 17, wherein said addition means adds a '1' bit to a current coefficient of the current block at that bitplane one below a predetermined minimum bitplane if and only if the addition does not increase the bitplane number of the most significant bit of the current coefficient beyond the determined bitplane number.

* * * * *

UNITED STATES PATENT AND TRADEMARK OFFICE
CERTIFICATE OF CORRECTION

PATENT NO. : 6,263,110 B1
DATED : July 17, 2001
INVENTOR(S) : James Philip Andrew et al.

It is certified that error appears in the above-identified patent and that said Letters Patent is hereby corrected as shown below:

Title page,
Item [73], Assignee, "Canon Kabushiki Kaisha, Tokyo (JP)" should read -- Canon Kabushiki Kaisha, Tokyo (JP); and Canon Information Systems Research Australia Pty. Ltd., North Ryde (AU) --.

Item [57], ABSTRACT,
Line 10, "includes" should read -- include --.

Column 2,
Line 9, "an be" should read -- can be --.

Column 5,
Line 36, "and" should be deleted.

Column 6,
Line 46, "implemented" should read -- be implemented --.

Column 12,
Line 62, "sub-block," should read -- sub-blocks, --.

Column 14,
Line 35, "subbands" should read -- subband --; and
Line 58, "plans 7," should read -- planes 7, --.

Column 15,
Line 23, "exmaple" should read -- example --;
Line 31, "if is" should read -- if its --;
Line 57, "fact" should read -- the fact --; and
Line 64, "round" should read -- rounding --.

UNITED STATES PATENT AND TRADEMARK OFFICE
CERTIFICATE OF CORRECTION

PATENT NO. : 6,263,110 B1
DATED : July 17, 2001
INVENTOR(S) : James Philip Andrew et al.

It is certified that error appears in the above-identified patent and that said Letters Patent is hereby corrected as shown below:

Column 16,
Line 46, "effect" should read -- affect --; and
Line 51, "effect" should read -- affect --.

Column 18,
Line 13, "be" should read -- can be --; and
Line 61, "block;" should read -- block: --.

Signed and Sealed this

Twenty-fourth Day of December, 2002

JAMES E. ROGAN
*Director of the United States Patent and Trademark Office*